United States Patent [19]

Conway

[11] 4,107,746
[45] Aug. 15, 1978

[54] CONTINUOUS SPIRAL MODE TRACKING IN A CONVENTIONAL DISK DRIVE USING CONCENTRIC SERVO TRACKS

[75] Inventor: David Laurence Conway, Bloomington, Minn.

[73] Assignee: Control Data Corporation, Minneapolis, Minn.

[21] Appl. No.: 844,674

[22] Filed: Oct. 25, 1977

[51] Int. Cl.$^2$ .............................................. H04N 5/76
[52] U.S. Cl. ..................................................... 360/78
[58] Field of Search ....................... 360/77, 78, 86, 73; 358/128; 179/100.3 V

[56] References Cited

U.S. PATENT DOCUMENTS

| 3,518,366 | 6/1970 | Phan | 360/86 X |
| 3,534,344 | 10/1970 | Santana | 360/77 |
| 3,757,030 | 9/1973 | Lynott | 360/86 |
| 3,838,457 | 9/1974 | Palmer | 360/78 |
| 4,022,968 | 5/1977 | Keizer | 358/128 |

OTHER PUBLICATIONS

IBM Technical Disclosure Bulletin, vol. 19, No. 6, Nov. 1976, pp. 1991-1992, "Self-Calibrating Disk Storage Apparatus" Griffiths & Van Winkle.

*Primary Examiner*—John H. Wolff
*Attorney, Agent, or Firm*—William J. McGinnis

[57] ABSTRACT

In a conventional disk drive device using concentric servo tracks to operate data heads on concentric data tracks, a second mode of operation is provided which is compatible with the use of concentric servo tracks for driving the data heads in a spiral, continuous mode for accessing all of the data on a particular disk surface in a single data read or data write operation. A conventional computer system disk drive could be modified for occasional use in storing and retransmission of video signals. In the preferred embodiment of the invention, each servo track is provided with a once per revolution clock pulse which starts the operation of an integrator. The integrator generates a time varying signal of the same period as the time for one revolution of the disk pack. An error signal is generated by conventional means to indicate the error in position of the servo tracking head with respect to the servo track. The signals produced by the integrator and the servo error position signal are used to continuously drive the servo positioner causing the data and servo heads to make a spiral track on the disk. While the data head is in the spiral tracking mode, the servo head is referenced with successive concentric servo tracks.

2 Claims, 9 Drawing Figures

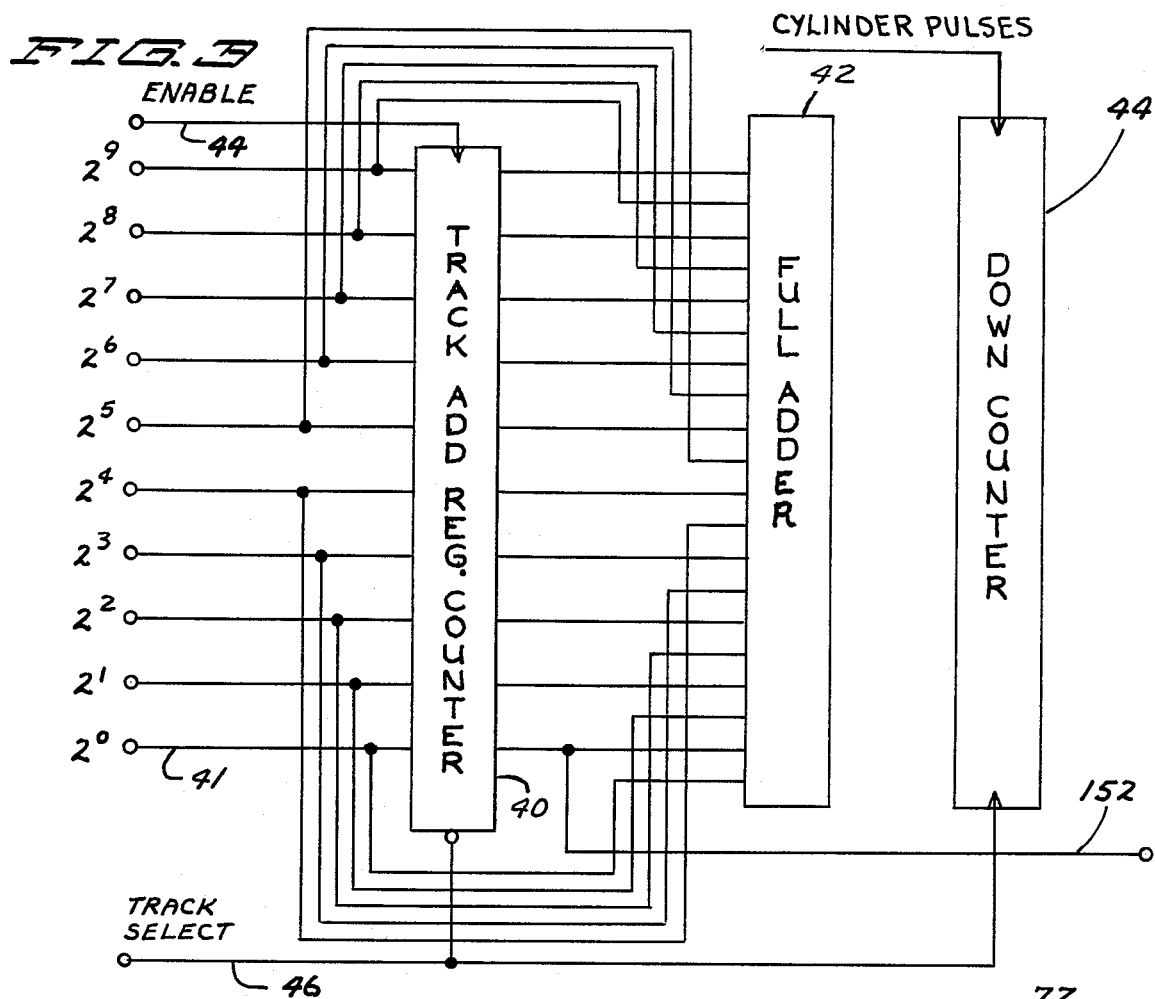
FIG. 3
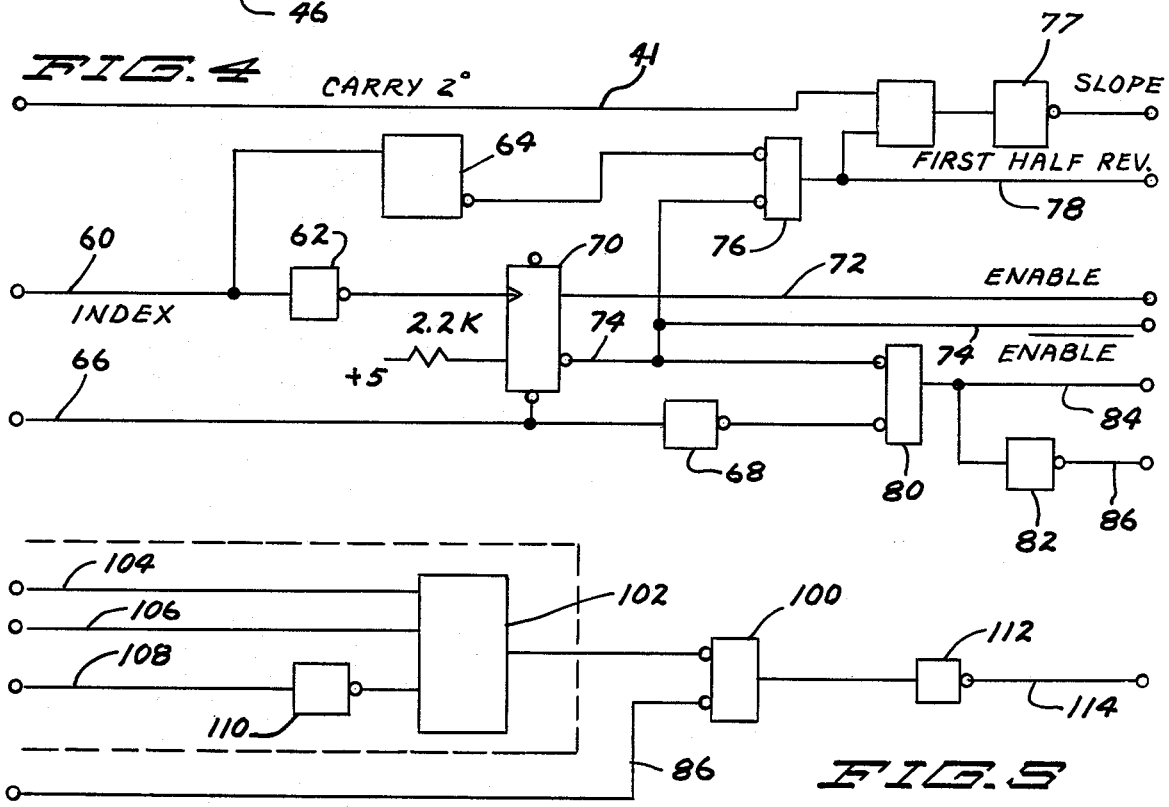
FIG. 4
FIG. 5

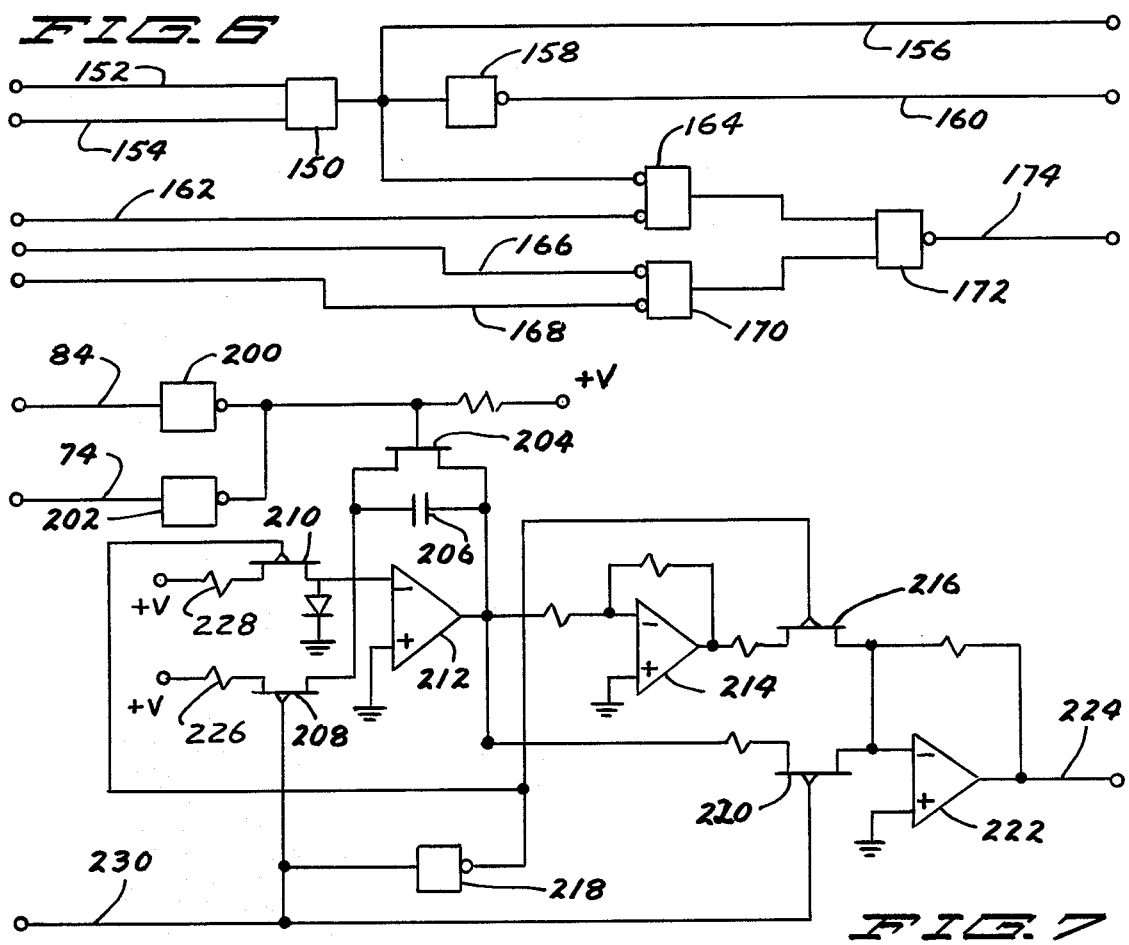
FIG. 6
FIG. 7
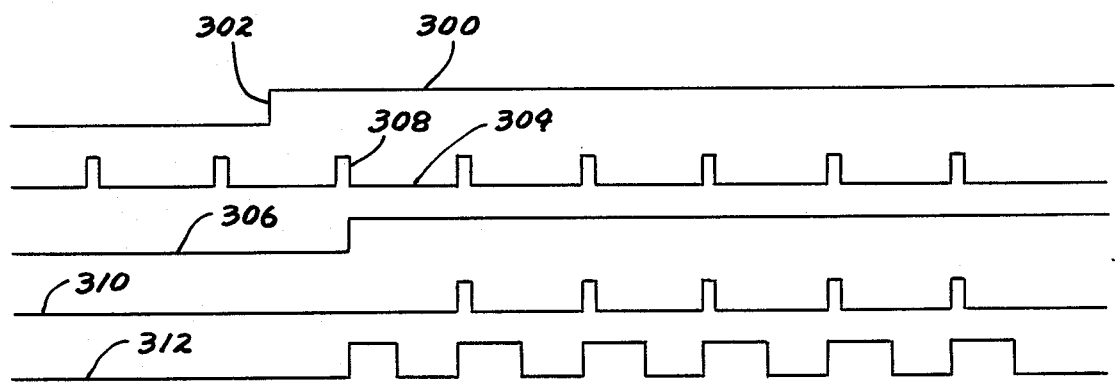
FIG. 8
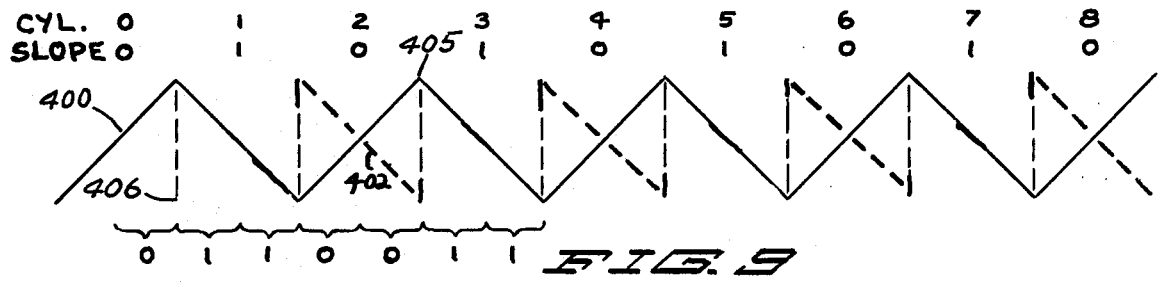
FIG. 9

CONTINUOUS SPIRAL MODE TRACKING IN A CONVENTIONAL DISK DRIVE USING CONCENTRIC SERVO TRACKS

BACKGROUND OF THE INVENTION

The present invention relates to a system which may be used with conventional disk storage equipment used for data handling in computer systems to allow operation in a continuous data acquisition or transmission mode. More specifically, this application relates to an invention whereby concentric servo tracks used in conventional data processing disk drive equipment may be used to operate the data heads in a spiral fashion with respect to the disk medium. Thus, the entire magnetic surface of the disk medium may be covered with a continuous playback or recording of data in a spiral tracking mode analogous to the manner in which a phonograph needle operates on a phonograph record.

As is well known, conventional data processing disk storage equipment operates with concentric servo tracks that close upon themselves arranged on the surface of a disk recording medium. These concentric servo tracks may occupy one or more disk surfaces in a disk pack while the other surfaces are for the purpose of receiving and replaying recorded data. Servo heads are used in such conventional devices to follow the position of a prerecorded servo track and thus operate a movable head positioning device so that the data heads are always located over a particular data track, corresponding to the servo track, in exactly the same position. This allows the device to efficiently retrieve and access data which has previously been stored. However, as is also well known, once data has been recorded or received from a particular data track, there is a certain interval of time during which the data head must be positioned to the next data track during which no information may be either received and stored or read and delivered. This interval of time, although short by human standards, is comparatively long with respect to the rate at which data may be entered into or retrieved from the system. It has been thought that if the technology and the high data rates available in modern computing equipment were available to read a single stream of data in or out on a continuous basis over an entire disk that greater usefulness can be obtained from such equipment. However, because of the fact that such equipments are designed for use with concentric servo tracks and appropriate control systems are already built into such devices based on concentric servo track design, extensive redesign would be required to make such units operate on spiral data tracks. Thus, it would be desirable to have a device which could allow the reading or writing of data in a continuous rotational spiral mode using as a position reference conventional concentric servo tracks already familiar to such equipment.

The prior art shows several systems using spiral tracks for video frequency systems such as that shown in U.S. Pat. No. 4,022,968. However, the system shown in that patent is controlled for timing purposes by a tachometer disk. Thus, the system utilized in that patent obtains certain information from a secondary disk, called a tachometer disk, but does not use or have such information based on any system of using concentric servo tracks.

One of many patents relating to the operation of the conventional concentric track servo and data disk storage systems is U.S. Pat. No. 3,838,457. This patent shows that the state of the art is well developed in computing systems for head positioning using concentric data tracks based on concentric servo tracks.

With respect to the present invention, it is not important which particular head positioning system based on concentric servo tracks is being used. It is necessary that a tracking system be used which provides a head error position signal which continuously gives a unique error position signal with respect to a particular servo track from the point where the head is positioned halfway between the given servo track and an outer servo track to the position where the servo head is positioned halfway between the given servo track and an inner servo track. That is, the servo tracking system employed in order to allow a unit to adapt to the present invention must be one such that when the servo head is passed continuously radially over a rotating servo disk having servo tracks thereon a continuous signal is generated indicating error position with respect to servo tracks. Generally, such an output will tend to consist of a triangular head position error signal which may be truncated at the peaks of the triangular wave forms but which is piecewise continuous.

Referring again to U.S. Pat. No. 3,838,457, other embodiments of the present invention may also be employed which work with a servo positioning signal or position error signal which varies with respect to centering over each individual servo track but which varies over a number of tracks as shown in the patent.

One further example of a suitable system for generating a head position error signal in a data processing system is that shown in U.S. Pat. No. 3,534,344.

U.S. Pat. No. 3,518,366 illustrates a slow motion picture video system based on magnetic disk storage elements. This patent shows a mechanical system for causing a transducer arm assembly to move a recording and playback device in a spiral fashion over a rotating disk. This type of machine can only operate in what will be called a "serial" fashion whereby a replay commences at the beginning of the recorded material, although the playback can be terminated at any desired place. This is distinct from a random access feature which allows the playback to commence at any selected portion of the recorded material. Furthermore, mechanical repositioning systems are subject to problems with respect to accurately and repeatedly returning to the same precise start position.

In the computer disk storage technology art, the improvement realized by the development of concentric data tracks and concentric servo tracks on the storage medium was principally that the data could be accessed in a random fashion by accessing or addressing any preselected data track with the selection of the appropriate servo track. This allowed significant improvement over other types of memory where all of the data had to be searched in order to read a particular desired fragment. Thus, the use of concentric data tracks combined with means for reading and writing on a continuous or serial spiral data track allows for both uninterrupted reading and writing of data as well as random access to a particular portion of the recorded data by reference to a particular servo track. In addition, a single disk can have a certain portion used in a spiral tracking mode and another portion used in a conventional mode.

U.S. Pat. No. 3,757,030 shows a video buffer memory with spiral tracking based on a scheme using a rotating disk and one or more transducer heads rotating on a parallel offset axis with respect to the rotational axis of the disk. This patent shows the complexity necessary to implement a mechanical system while the present invention is based on an electronic system design which may be used with otherwise conventional equipment.

SUMMARY OF THE INVENTION

The present invention includes means for adapting a conventional data processing disk memory device using concentric servo tracks to a mode whereby the concentric servo tracks are used to drive the data read and write heads in a spiral fashion on one or more data disks. Use of this technique allows for continuous, serial reading and writing of data, such as a video signal in a continuous fashion limited only by the total data capacity of a given disk. Further, the use of concentric servo tracks to provide position control for generating the spiral track allows for random access of a particular portion of the signal which may be recorded by the device. A preferred embodiment of the present invention is based on a position error signal means which produces a continuous, linear position error signal with respect to a given servo track. Based on a clock signal associated with each servo track, an integrator generates a linear function which is combined with the position error signal in such a way that the position transducer is continuously and linearly driven radially with respect to a rotating magnetic disk so that the magnetic read/write heads operated by the transducer are driven in a continuous spiral track on the medium.

IN THE FIGURES

FIG. 3 is a schematic representation of the logic circuit for successively addressing adjacent servo tracks according to the present invention;

FIG. 4 is a schematic diagram of the logic circuit controlling the initiation of the spiral mode functioning for a conventional disk drive device;

FIG. 5 is a further logic schematic diagram with respect to implementation of the present invention;

FIG. 6 is further logic schematically shown with respect to implementing the present invention;

FIG. 7 is a schematic diagram of the circuit for implementing a spiral mode positioned control signal for the data transducer according to the present invention;

FIG. 8 is a representation of signals occurring in the logic systems shown schematically in FIGS. 4, 5 and 6 according to the present invention while;

FIG. 9 is a schematic representation of the output of the control circuits showing successive addressing of successive servo tracks together with the continuous linear transducer position control signal to generate spiral tracking according to the present invention.

DESCRIPTION OF THE PREFERRED EMBODIMENT

Figure 1:
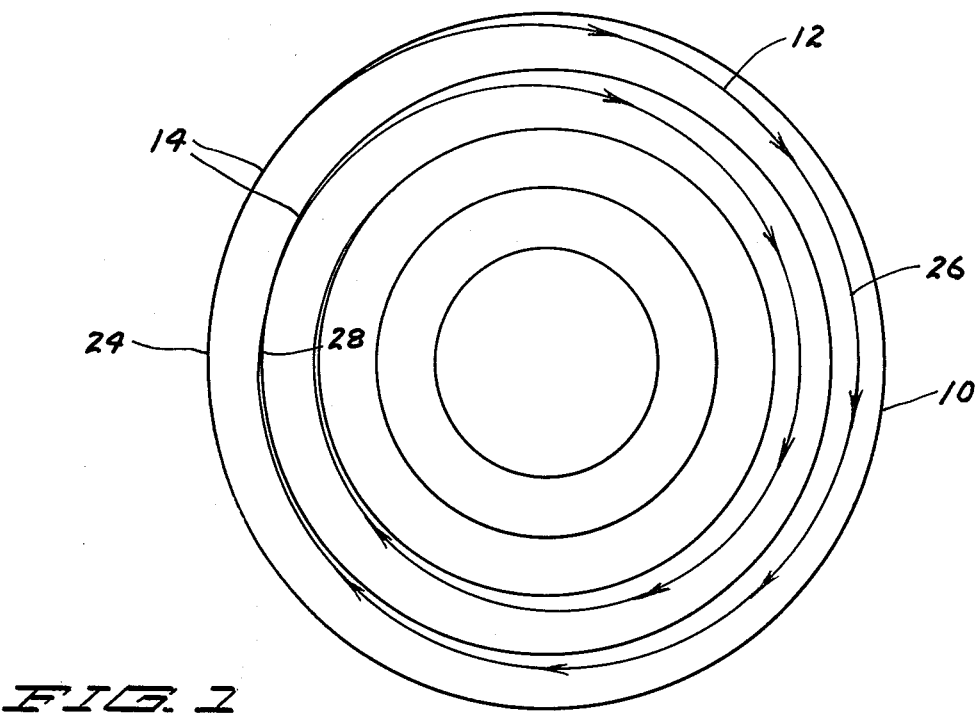
FIG. 1 is a representation of the spiral track formed by a read/write transducer with respect to a magnetic disk according to the present invention.

Referring now to FIG. 1, the surface of a conventional data disk 10 is shown diagramatically with a spiral track 12 illustrated as representing the manner in which a read/write transducer moves over the disk while it is rotating. Conventional concentric data or servo tracks 14 are also represented diagramatically. It can be seen that the transducer according to the present invention will move during one revolution from one of the conventional concentric data or servo tracks to the next conventional data or servo track. Thus, the data handling capacity of the disk is not reduced by operation in the spiral mode.

Figure 2:
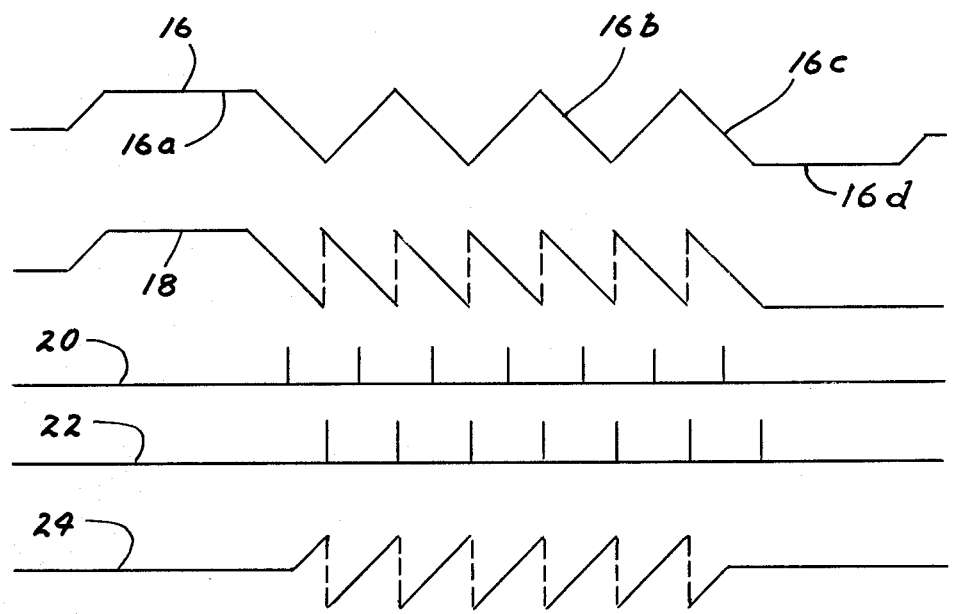
FIG. 2 is a representation of various control signal wave forms generated by the circuit referenced to the position error transfer function according to the present invention.

FIG. 2 shows waveforms of the system by which this embodiment of the present invention operates to continually move data heads in such a manner as to result in spiral track disk data recording. Electronic circuitry, to be described, in conjunction with a standard concentric servo track disk is used to initially position the data head at the disk radius. A synchronizing signal developed from the disk surface initiates operation. The length of movement along the disk radius is one track width per disk revolution. The spiral motion of the radially moving head with respect to the rotating disk can be produced by summing a voltage ramp, produced by an integrator, having the proper polarity and correct timing, with the fine position error signal generated by a conventional servo track error position signal generator, sometimes referred to as a demodulator, to control continuous radial head movement.

In FIG. 2, illustrative wave form 16 shows the output of a conventional position error signal demodulator as a servo head traverses across several servo tracks on a servo disk. The comparatively long wave form peak at 16a and 16d represent the outer and inner guardbands written on the disk surface. The regular triangular wave forms like 16b and 16c are conventional wave forms produced by passage in a continuous radially linear fashion of the servo head over servo tracks. Wave form 18 shown in FIG. 2 shows the result of inversion of every other slope, beginning at cylinder 0 + ½ of the wave form 16 shown in FIG. 2 so that only descending sloped wave forms are generated, required for servo loop stability. Each servo track is referred to as a cylinder in reference to the cylinder identified in a stack of disks.

Wave form 20 in FIG. 2 shows the synchronizing signal developed from the servo disk index marks. Note that these index marks correspond to the position where the servo heads are centered over the servo tracks as represented by the zero error signal or zero crossing condition of wave form 16. Wave form 22 shows wave form 20 shifted in time by one-half the rotation time for the data disk to generate an index signal to invert the position signal 16 represented by signal 18 and start the voltage integrator to drive the position transducer positioner. Wave form 24 shows an integrated voltage slope which will provide a controlling drive signal to the head position transducer positioner. Inversion of the signal and slope change occurs at positions determined on the one-half rotation interval as indexed by the wave form 22. It is a condition that, at the commencement of any given disk rotation, the servo transducer will be located properly over the center of the servo track and thus produce no position error signal. The indexing and commencement of the integrator position driver signal initiated by the disk derived index signal must commence at index time when the servo transducer will be located exactly halfway between concentric servo tracks.

Referring again to FIG. 1, a cycle of operation begins with the servo transducer located at point 24 centered over a servo track coincident with a disk index signal. The position drive signal integrator voltage begins driving the head transducer so that it traverses a clockwise path with respect to the disk one-half revolution to position 26. The heads have moved one-half track width from the servo track centers at position 26. The delayed index wave form 22 shown in FIG. 2 causes logic circuitry, to be explained, to invert the position error signal and the integrator input and output. The head continues to move continuously back to the starting position at the beginning of the disk except that it will have moved one track width to position 28.

Referring now to FIG. 3, a track and register counter 40 is connected to a full adder 42. The track register and counter 40 has various inputs, labeled in the figure, corresponding to the individual binary input lines for a given track address for a standard disk in the disk pack. The present state of the art allows for approximately 400 tracks per inch on a disk which is 14 inches in diameter with a central hub 6.6 inches in diameter. An enable input line 44 is also connected to address register and counter 40 and receives its input from logic circuitry elsewhere in the system when the user desires to use the spiral tracking mode rather than the conventional random access mode. A down counter 44 is included and connected to the full adder 42 and counter register 40. In the spiral mode, as the disk makes each revolution and an index mark generates an index signal, the track address, register and counter is activated to adjust its contents by one track so that the register 40 is always remembering the particular track on which data is being written or played. When it is desired to address a particular track, in either conventional or spiral mode, the address is supplied to counter 40 and a pulse is transmitted on the track select input line 46.

Referring now to FIG. 4, a logic circuit is shown for generating various of the control functions in order to implement the present invention. An input line 60 receives each index pulse sensed on the servo track by the servo track head. This pulse is received by an inverter 62 and an inverter and delay gate 64. The delay of gate 64 is equivalent to about one-half revolution. The spiral mode command signal from logic within the computer is received on input 66 which is connected to inverter 68 and device 70. Device 70 is a logic latch that arms the spiral mode operation at any portion of the disk rotation. An index signal on line 60 then enables the spiral mode operation when it is received. Device 70 has a first output 72 which is a logic signal generating the spiral mode ENABLE signal which is connected to input 44 shown in FIG. 3. Device 70 has a second output 74 which is the logical inverse of the output on output line 72, or the NOT ENABLE signal. The inverted output of delay and inverter 64 is connected with NOR gate 76 together with the output 74 from device 70. NOR gate 76 generates an output 78 which produces a logic output index signal corresponding to the first half revolution. As explained earlier, the index pulses are used at the half revolution occurrences to adjust the track address register so that the servo track counter is looking at the next most inward or the next down count servo track. The index pulse when received with an input on line 41 also causes inversion of the position transducer control signal so that instead of moving away from the previous track the transducer is now moving towards the next or newly addressed track. This slope command is generated at the output of inverter 77. NOR gate 80 receives an output from inverter 68 and an output from device 70 through output line 74. NOR gate 80 produces an output which is the logical combination of the spiral mode ENABLE and the INDEX input lines. An inverter 82 produces the logical inverse of the combination 84 on output line 86.

Referring now to FIG. 5, NAND gate 100 receives an input which corresponds to the logical inverse of the combination of the spiral mode ENABLE and INDEX signals produced on output signal line 86 as shown in FIG. 4. NAND gate 102 receives three input signals. The first signal is 104 which is an error signal from the position sensing circuit which indicates when the servo tracking mechanism is exactly on the center of a servo track. A second input line is simply an enable or a ready signal 106 which indicates that the unit is operative. The third input line is the logical inverse of the track select signal 108 which passes through an inverter 110 before being received by device 102. The output of NAND gate 100 is connected to an inverter 112. The circuit has an output line 114 which produces the inverse of the logical combination of all of the input signals. This signal on output line 114 is used to trigger the clock input of the slope latch in the spiral mode of operation to generate the signal causing the position transducer to function in the spiral mode. An additional control will allow a spiral mode toward the spindle or away from the spindle.

Referring now to FIG. 6, a logic circuit is shown which serves the function of determining whether the position signal for operating in the spiral mode should be an increasing slope or a decreasing slope depending upon whether or not the servo positioner is operating towards a servo track center or away from a track center to the point where it would engage with the next inward track. Thus, this logic circuit has the function of keeping track of whether or not the track counter has just operated or whether it is about to operate. The logic circuit of FIG. 6 has the following inputs connected to EXCLUSIVE OR gate 150, a first input 152 consisting of the least significant bit output from the track address register and counter 40 shown in FIG. 3. A second input 154 is the output corresponding to the first half revolution output line 78 shown in FIG. 4. The output of EXCLUSIVE OR gate 150 provides an output line 156 which when high or equal to a binary one indicates an even address in the address register. An inverter 158 produces the logical inverse of the output on line 156 on an output line 160. An input line 162 carries the spiral mode ENABLE signal to NAND gate 164 together with an output line from EXCLUSIVE OR gate 150. The logical inverse of the spiral mode ENABLE signal serves as an input on input line 166 which together with the logical inverse of the slope signal 168 is connected to NAND gate 170. The output of gates 164 and 170 is connected to a further NAND gate 172. The output of NAND gate 172 is on an output line 174 and is a logic high or binary one when the carriage address register is true and the spiral mode is enabled.

Referring now to FIG. 7, the circuit which generates the ramp signal which is supplied to the position transducer to generate the spiral mode tracking is shown. A first input to an inverter 200 is shown as the spiral mode enable combination with the index signal which is output line 84 as shown in FIG. 4 and labeled as 84 in FIG. 7. A second inverter 202 receives as its input the logical inverse of the spiral mode ENABLE signal which corresponds to output signal 74 as shown in FIG. 4. These two inverters use their OR'ED outputs to drive the gate of a FET switch 204 which controls the integrator formed by capacitor 206, operational amplifier 212, and resistor 226 or 228, depending on the state of FET switches 208 and 210. The output of amplifier 212 is supplied to amplifier 222 through FET switch 220, or if an inversion is required, through operational amplifier 214 and FET switch 216. The gate of FET switch 216 and 220 is controlled by inverter 218 and input 230 respectively. The output 224 is provided from operational amplifier 212 or 214 if an inversion is required. Depending upon whether a positive or negative slope output is desired from the slope generator circuit, FET switch 216 is activated to allow the output of amplifier 214 to provide the drive signal on the output circuit 224 or, alternatively, FET switch 220 is activated to allow the amplifier 222 to provide the drive signal to the circuit on output line circuit 224. Capacitor 206 serves as the integrator element within the circuit and controls the slope generation feature. The control feature to allow the slope generator to provide the correct signal during each revolution of the disk in the spiral tracking mode is controlled by a slope input logic level 230 which controls FET switches 208, 220, 210, and 216.

Referring now to FIG. 8, the following signals are shown schematically, the spiral mode command signal as shown as wave form 300 which goes from a binary zero to a binary one at point 302 when the logic circuit within the system determines that it is desired to operate in spiral mode. Wave form 304 shows the regularly occuring index signal on the servo track. Wave form 306 shows that the spiral mode ENABLE signal is generated at the first index signal after the spiral mode command signal is received. The spiral mode ENABLE signal is shown as becoming a binary one at the first index pulse 308 after the spiral mode command pulse 302 is received. The spiral mode ENABLE signal is shown as output 72 in FIG. 4. Wave form 310 is the logical combination of the spiral mode ENABLE signal 306 and the index pulse signal 304. This logical combination signal is shown as the output 84 in FIG. 4. Finally, wave form 312 represents the first half revolution output signal which occurs on output line 78 as shown in FIG. 4.

Referring now to FIG. 9, output signal 400 from the servo head demodulator is shown as a triangular wave form like 16 in FIG. 2. This is a typical waveform varying with time as the servo head is positioned radially along the disk at a constant velocity. The amplitude of this signal is indictative of the position displacement of the data heads from the center of the concentric servo track. Output 400 is inverted as shown at the maximum negative peaks of the transfer function 405 and 406 and is like output 18 in FIG. 2. Transfer function 402 is in the forward loop in the servo position loop which is required for system stability. Signal 24 in FIG. 2 is the initiating command which is output 224 from FIG. 7. This piecewise continuous signal varying linearly with time is summed in the position loop. For the position error to remain near zero — the difference between 24 and 402 divided by position loop gain — signal 402 must be nearly equal in magnitude and opposite in polarity. Spiral operation is initiated by analog input 24 on cylinder 0 with slope 0 for example. The position transducer drives the servo head away from the servo track by a half width. This is the first upward slope in FIG. 9. When the peak of the transfer function is attained waveform 400 is inverted and is now represented by 402. Concurrently integrator output 24 is inverted and polarity of integration is reversed as controlled by the circuits in FIG. 7. The positioner now automatically drives toward cylinder 1 and continues on to cylinder 1 plus a half track width where the operation repeats. The integrator output when the head is over cylinder 1 is reset to 0 to compensate for integrator drift.

What is claimed is:

1. A system for operating a disk drive of the type used with a disk pack having a servo disk and at least one data disk and in which the disk pack rotates continuously at a constant speed and a transducer arm moves radially with respect to the disk pack, said system being a system to write and read data in a spiral tracking mode on a data disk while position is referenced with respect to a plurality of concentric servo tracks, said system comprising:

track address register means for referencing the number of the servo track being accessed,
   means for incrementing said track address register means in response to a data signal,
   means for receiving position error signal of a servo track transducer head with respect to a servo track and inverting said signal in response to a data signal and leaving it unchanged in the absence of a data signal,
   means for receiving a once per revolution servo track index signal and generating a data signal after a predetermined time delay said data signal being transmitted to said means for receiving a position error signal and said means for incrementing said track address register,
   integrator means for generating a continuous time varying signal,
   means for initiating said integrator in response to a data signal from said means for receiving, and
   means for summing said position error signal and the output of said integrator to form a signal for controlling said head arm transducer.

2. A system for operating a disk drive of the type used with a disk pack having a servo disk and at least one data disk and in which the disk pack rotates continuously at a constant speed and a servo positioner moves with respect to the disk pack, said system being a system to write and read data in a spiral tracking mode on a data disk while position is referenced with respect to a plurality of concentric servo tracks, said system comprising:

track address register means for referencing the number of the servo track being accessed,
   means for incrementing said track address register means in response to a first control
   means for generating said first control signal in response to a once per revolution servo track index signal,
   means for receiving a position error signal of a servo track servo device with respect to a servo track and inverting said signal in response to a second control signal and leaving it unchanged in the absence of said second control signal,
   means for receiving a once per revolution servo track index signal and generating said second control signal after a predetermined time delay generally a one-half revolution time said second control signal being transmitted to said means for receiving a position error signal,
   integrator means for generating a continuous time varying signal,
   means for initiating said integrator in response to said first control signals and to said second control signal from said means for receiving, and
   means for summing said position error signal and the output of said integrator to form a signal for controlling said servo positioner.

* * * * *